(12) United States Patent
Matsuda et al.

(10) Patent No.: US 6,853,097 B2
(45) Date of Patent: Feb. 8, 2005

(54) UNITERRUPTIBLE POWER SUPPLY AND ITS STARTING METHOD

(75) Inventors: Kensaku Matsuda, Tokyo (JP); Manabu Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/472,527

(22) PCT Filed: Oct. 3, 2001

(86) PCT No.: PCT/JP01/08711

§ 371 (c)(1), (2), (4) Date: Sep. 24, 2003

(87) PCT Pub. No.: WO03/032466

PCT Pub. Date: Apr. 17, 2003

(65) Prior Publication Data
US 2004/0108836 A1 Jun. 10, 2004

(51) Int. Cl.⁷ ............................................. H02M 5/458
(52) U.S. Cl. ............................. 307/66; 307/64; 307/110
(58) Field of Search .............................. 307/64, 66, 110; 363/124

(56) References Cited

U.S. PATENT DOCUMENTS

| | | | | |
|---|---|---|---|---|
| 4,763,013 A | * | 8/1988 | Gvoth et al. | 307/66 |
| 4,823,247 A | * | 4/1989 | Tamoto | 363/16 |
| 5,057,698 A | * | 10/1991 | Widener et al. | 307/66 |
| 5,291,383 A | * | 3/1994 | Oughton | 363/17 |
| 6,314,007 B2 | * | 11/2001 | Johnson et al. | 363/37 |
| 6,400,586 B2 | * | 6/2002 | Raddi et al. | 363/37 |
| 6,400,591 B2 | * | 6/2002 | Reilly et al. | 363/125 |
| 6,483,730 B2 | * | 11/2002 | Johnson, Jr. | 363/123 |
| 6,661,678 B2 | * | 12/2003 | Raddi et al. | 363/37 |

* cited by examiner

Primary Examiner—Bao Q. Vu
(74) Attorney, Agent, or Firm—Sughrue Mion, PLLC

(57) ABSTRACT

The present invention provides an uniterruptible electric power supply capable of inhibiting an excessively high intensity of inrush electric current at the time of start even when the inrush electric current inhibiting resistor 3 is not used.

3 Claims, 8 Drawing Sheets

UNITERRUPTIBLE POWER SUPPLY AND ITS STARTING METHOD

TECHNICAL FIELD

The present invention relates to an uniterruptible electric power supply in which a battery is built. In the case of electric power failure, AC electric power is generated from this battery and supplied to electric equipment by this uniterruptible electric power supply. The present invention also relates to a method of starting the uniterruptible electric power supply.

BACKGROUND ART

FIG. 4 is an arrangement view showing an outline of the conventional uniterruptible electric power supply.

In the view, reference numeral 1 is an AC electric power supply, reference numeral 2 is a condenser connected in parallel with the AC electric power supply 1, reference numeral 3 is an inrush electric current inhibiting resistor for inhibiting an inrush electric current, reference numeral 4 is a switch connected in parallel with the inrush electric current inhibiting resistor 3, reference numeral 5 is an AC-electric-power-supply/battery changeover switch for changing over between the AC electric power supply and the battery, and reference numeral 6 is a reactor for forming a filter together with the condenser 2.

One end of the AC electric power supply 1 and one end of the AC output are connected with each other by a common line, and a connecting point of the first condenser 14 and the second condenser 15, which are connected with each other in series, is connected with the common line. The other end of the AC electric power supply 1 is connected with the inrush electric current inhibiting resistor 3 and the switch 4 which is connected in parallel with the inrush electric current inhibiting resistor 3. The contact "a" of the AC-electric-power-supply/battery changeover switch 5 is connected with the inrush electric current inhibiting resistor 3 and the switch 4, which is connected in parallel with the inrush electric current inhibiting resistor 3, when the AC electric power supply is turned on. The contact "b" is connected with the battery operation switch 27 described later when the battery is turned on. The contact "c" is connected with the reactor 6.

Reference numerals 7, 8, 9 and 10 are diodes composing a diode bridge, and reference numeral 11 is a first semiconductor switch connected with this diode bridge in parallel. The diode bridge, which is composed of the diodes 7, 8, 9 and 10, and the first semiconductor switch 11, which is connected with the diode bridge in parallel, compose a converter section and connect between one end of the reactor 6 and the common line.

Reference numeral 12 is a first diode for preventing a back current, reference numeral 13 is a second diode for preventing a back current, reference numeral 14 is a first condenser connected between the P-voltage line and the common line, and reference numeral 15 is a second condenser connected between the common line and the N-voltage line.

Reference numeral 16 is a first semiconductor switch in the inverter section, reference numeral 17 is a diode connected in reverse parallel with the semiconductor switch 16, reference numeral 18 is a second semiconductor switch in the inverter section, and reference numeral 19 is a diode connected in reverse parallel with the semiconductor switch 18. The semiconductor switch 16, diode 17, semiconductor switch 18 and diode 19 compose an inverter section for converting DC electric power, which is sent from the DC electric power supply including the first condenser 14 and the second condenser 15, into AC electric power.

Reference numeral 20 is a filter composed of the reactor and condenser, and reference numeral 21 is a load.

Reference numeral 22 is a first semiconductor switch of the balance section, reference 23 is a diode connected in reverse parallel with the semiconductor switch 22, reference numeral 24 is a second semiconductor switch of the balance section, reference numeral 25 is a diode connected in reverse parallel with the semiconductor switch 24, and reference numeral 26 is a reactor of the balance section.

The first semiconductor switch 22 of the balance section, one end (the collector side in the drawing) of which is connected with P-voltage line and the other end (the emitter side in the drawing) of which is connected with one end (the collector side in the drawing) of the second semiconductor switch 24 of the balance section and also connected with the reactor 26 of the balance section, the second semiconductor switch 24 of the balance section, one end. (the collector side in the drawing) of which is connected with the other end of the first semiconductor switch 22 of the balance section and also connected with the reactor 26 of the balance section and the other end (the emitter side in the drawing) of which is connected with N-voltage line, the back current preventing diode 23, the cathode side of which is connected with one end (collector side in the drawing) of the first semiconductor switch 22 of the balance section and the anode side of which is connected with the other end (emitter side in the drawing) of the first semiconductor switch 22 of the balance section, the back current preventing diode 25, the cathode side of which is connected with one end (the collector side in the drawing) of the semiconductor switch 24 of the balance section and the anode side of which is connected with the other end (the emitter side in the drawing) of the second semiconductor switch 24 of the balance section, and the rector 26 of the balance section connected between the connecting point, which connects the first semiconductor switch 22 of the balance section and the second semiconductor switch 24 of the balance section, and the common line, compose a balance section which moves an electric charge between the first condenser 14, which is connected between P-voltage line and the common line, and the second condenser 15 connected between the common line and N-voltage line.

Reference numeral 27 is a battery operation switch, and reference numeral 28 is a battery which is an electric power supply for supplying electric power in the case of electric power failure. The negative electrode side of the battery 28 is connected with the common line, and the positive electrode side of the battery 28 is connected with the battery operation switch 27 and one end (collector side in the drawing) of the negative electrode side boosting section semiconductor switch 29 described later. Reference numeral 29 is a negative electrode side boosting section semiconductor switch, and reference numeral 30 is a negative electrode side boosting section diode, and reference numeral 31 is a negative electrode side boosting section reactor.

The battery 28, the negative electrode side boosting section semiconductor switch 29, one end (the collector side in the drawing) of which is connected with the positive electrode side of the battery 28 and the other end (the emitter side in the drawing) of which is connected with the negative electrode side boosting section reactor 31 and negative electrode side boosting section diode 30, the negative electrode side boosting section reactor 31 connected between the other end (the emitter side in the drawing) of the negative electrode side boosting section semiconductor switch 29 and the common line, and the negative electrode side boosting section diode 30 connected between the other end (the emitter side in the drawing) of the negative electrode side boosting section semiconductor switch 29 and N-voltage line, compose an N-side boosting section.

Reference numeral 32 is a voltage detector for detecting voltage of the first condenser 14 and for detecting voltage of the second condenser 15. Reference numeral 33b is a control circuit for controlling the switch 4 connected in parallel with the inrush electric current inhibiting resistor 3, the AC-electric-power-supply/battery changeover switch 5, the battery operation switch 27, the first semiconductor switch 11, the first semiconductor switch 16 of the inverter section, the second semiconductor switch 18 of the inverter section, the first semiconductor switch 22 of the balance section, the second semiconductor switch 24 of the balance section, and the negative electrode side boosting section semiconductor switch 29.

The conventional uninterruptible electric power supply operates as follows. The first condenser 14 and the second condenser 15 are electrically charged by the AC electric power supply 1 (in the case of normal operation) or the battery 28 (in the case of electric power failure). In the inverter section including the first semiconductor switch 16 of the inverter section, the diode 17, the second semiconductor switch 18 of the inverter section and the diode 19, DC electric power sent from the DC electric power supply, which is composed of the first condenser 14 and the second condenser 15, is converted into AC electric power. The thus converted AC electric power is supplied to the load 21.

FIGS. 5 and 6 are views for explaining operation of electrical charging conducted by the AC electric power supply 1 in the conventional uninterruptible electric power supply. In the views, reference numerals 1 and 3 to 15 are the same as those shown in FIG. 4. Therefore, explanations are omitted here.

Referring to FIGS. 4, 5 and 6, an electrically charging motion of the conventional uninterruptible electric power supply in the case of normal operation will be explained below.

In the case of normal operation conducted by the AC electric power supply 1, in the start of operation in which the AC-electric-power-supply/battery changeover switch 5 is set on the contact "a" side, the first condenser 14 and the second condenser 15 have not been electrically charged yet. Therefore, in order to inhibit an inrush electric current flowing into the first condenser 14 and the second condenser 15, the switch 4 is opened which is connected in parallel with the inrush electric current inhibiting resistor 3.

In the case where the AC electric power supply 1 generates a positive voltage, the first semiconductor switch 11 is turned on, and electric energy is stored in the reactor 6 by the route of the AC electric power supply 1→the inrush electric current inhibiting resistor 3 in the case of starting→the AC-electric-power-supply/battery changeover switch 5→the reactor 6→the diode 7 of the diode bridge→the first semiconductor switch 11→the diode 10 of the diode bridge→the AC electric power supply 1 as shown in FIG. 5A. Successively, the first semiconductor switch 11 is turned off and electric energy stored in the reactor 6 is charged into the first condenser 14 by the route of the reactor 6→the first diode 12 for preventing a back current→the first condenser 14→the AC electric power supply 1→the inrush electric current inhibiting resistor 3→the AC-electric-power-supply/battery changeover switch 5→the reactor 6, and the P-voltage line is formed with respect to the common line as shown in FIG. 5B.

In the case where the AC electric power supply 1 generates a negative voltage, the first semiconductor switch 11 is turned on, and electric energy is stored in the reactor 6 by the route of the AC electric power supply, →the diode 8 of the diode bridge→the first semiconductor switch 11→the diode 9 of the diode bridge→the reactor 6→the AC-electric-power-supply/battery changeover switch 5→the inrush electric current inhibiting resistor 3→the AC electric power supply 1 as shown in FIG. 6A. Successively, the first semiconductor switch 11 is turned off, and electric energy stored in the reactor 6 is charged into the second condenser 15 by the route of the reactor 6→the AC-electric-power-supply/battery changeover switch 5→the inrush electric current inhibiting resistor 3→the AC electric power supply 1→the second condenser 15→the second diode 13 for preventing a back current→the reactor 6, and the N-voltage line is formed with respect to the common line as shown in FIG. 6B.

When voltage of the first condenser 14 and voltage of the second condenser 15 are higher than the peak value of the AC electric power supply 1, for example, when voltage of the first condenser 14 and voltage of the second condenser 15 are 141 V in the case of operation of 100 V or when voltage of the first condenser 14 and voltage of the second condenser 15 are 180 V in the case of operation of 120 V, the switch 4 is short-circuited.

In the case of normal operation conducted by the AC electric power supply 1, after voltage of the first condenser 14 and voltage of the second condenser 15 have become higher than the peak value of the AC electric power supply 1, an electrically charging motion is executed by the route in which the above inrush electric current inhibiting resistor 3 is replaced with the switch 4.

In the case where the AC electric power supply 1 generates a positive voltage, the first semiconductor switch 11 is turned on, and electric energy is stored in the reactor 6 by the route of the AC electric power supply 1→the switch 4→the AC-electric-power-supply/battery changeover switch 5→the reactor 6→the diode 7 of the diode bridge→the first semiconductor switch 11→the diode 10 of the diode bridge→the AC electric power supply 1 as shown in FIG. 5A. Successively, the first semiconductor switch 11 is turned off, and electric energy stored in the reactor 6 is charged into the first condenser 14 by the route of the reactor 6→the first diode 12 for preventing a back current→the first condenser 14→the AC electric power supply 1→the switch 4→the AC-electric-power-supply/battery changeover switch 5→the reactor 6, and the P-voltage line is formed with respect to the common line as shown in FIG. 5B.

In the case where the AC electric power supply generates a negative voltage, the first semiconductor switch 11 is turned on, and electric energy is stored in the reactor 6 by the route of the AC electric power supply 1→the diode 8 of the diode bridge→the first semiconductor switch 11→the diode 9 of the diode bridge→the reactor 6→the AC-electric-power-supply/battery changeover switch 5→the switch 4→the AC electric power supply 1 as shown in FIG. 6A. Successively, the first semiconductor switch 11 is turned off, and electric energy stored in the reactor 6 is charged into the second condenser 15 by the route of the reactor 6→the AC-electric-power-supply/battery changeover switch 5→the switch 4→the AC electric power supply 1→the second condenser 15→the second diode 13 for preventing a back current→the reactor 6, and the N-voltage line is formed with respect to the common line as shown in FIG. 6B.

FIGS. 7 and 8 are views for explaining an electrically charging motion conducted by the battery 28 of the conventional uniterruptible electric power supply. In the views, reference numerals 5 to 7, 10 to 12, 14, 15 and 27 to 31 are the same as those shown in FIG. 4. Therefore, the explanations are omitted here.

Referring to FIGS. 4, 7 and 8, explanations will be made into the electrically charging motion conducted by the battery in the conventional uniterruptible electric power supply in the case of electric power failure.

In the case of electric power failure, the AC-electric-power-supply/battery changeover switch 5 is changed over to the contact "b" side, so that the battery operation switch 27 is short-circuited.

The first semiconductor switch 11 is turned on, and electric energy is stored in the reactor 6 by the route of the battery 28→the battery operation switch 27→the AC-electric-power-supply/battery changeover switch 5→the reactor 6→the diode 7 of the diode bridge→the first semiconductor switch 11→the diode 10 of the diode bridge→the battery 28 as shown in FIG. 7A. Successively, the first semiconductor switch 11 is turned off, and electric energy stored in the reactor 6 is charged into the first condenser 14 by the route of the reactor 6→the first diode 12 for preventing a back current→the first condenser 14→the battery 28→the battery operation switch 27→the AC-electric-power-supply/battery changeover switch 5→the reactor 6 as shown in FIG. 7B.

The negative electrode side boosting section semiconductor switch 29 is turned on, and electric energy is stored in the negative electrode side boosting section reactor 31 by the route of the battery 28→the negative electrode side boosting section semiconductor switch 29→the negative electrode side boosting section reactor 31→the battery 28 as shown in FIG. 8A. Successively, the negative electrode side boosting section semiconductor switch 29 is turned off, and electric energy stored in the negative electrode side boosting section reactor 31 is charged into the second condenser 15 by the route of the negative electrode side boosting section reactor 31→the second condenser 15→the negative electrode side boosting section diode 30→the negative electrode side boosting section reactor 31 as shown in FIG. 8B.

By using the voltage of the first condenser 14 and voltage of the second condenser 15 which are electrically charged in the above way, DC electric power is converted into AC electric power by the inverter section, so that AC electric power is supplied to the load 21. However, in the case where voltage of the first condenser 14 and voltage of the second condenser 15 are not balanced to each other by the unbalance of the load 21, electrical charges of the first condenser 14 and the second condenser 15 are moved by the action of the balance section which is composed of: the first semiconductor switch 22 of the balance section and the second semiconductor switch 24 of the balance section connected in series between P-voltage line and N-voltage line; and the balance section reactor 26 connected between the contact point, at which the first semiconductor switch 22 of the balance section is contacted with the second semiconductor switch 24 of the balance section, and the common line.

In the conventional uniterruptible electric power supply, at the time of start in which the first condenser 14 and the second condenser 15 are not electrically charged, in the case of connecting with the AC electric power supply 1, an inrush electric current flows in the first condenser 14 and the second condenser 15. In order to inhibit the intensity of the inrush electric current flowing in the first condenser 14 and the second condenser 15, it is necessary to use the inrush electric current inhibiting resistor 3 for inhibiting the inrush electric current flowing at the time of start. Since the inrush electric current inhibiting resistor 3 consumes a high intensity of electric power, the size of the resistor 3 is large. Further, the inrush electric current inhibiting resistor 3 consumes a high intensity of electric power and generates a large quantity of heat. Therefore, it is difficult to reduce the size of the uniterruptible electric power supply.

The present invention has been accomplished to solve the above conventional problems. It is an object to provide an uniterruptible electric power supply capable of inhibiting an excessively high intensity of inrush electric current at the time of start even when the inrush electric current inhibiting resistor 3 is not used.

DISCLOSURE OF THE INVENTION

The present invention provides an uniterruptible electric power supply comprising: a converter section for converting AC electric power of an AC electric power supply into DC electric power; a battery used as an electric power supply in the case of start and also in the case of electric power failure; a condenser for storing DC voltage converted by the converter section or DC voltage supplied from the battery; an inverter section for converting DC voltage of the condenser into AC electric power; and a control section for controlling so that the condenser is electrically charged by the battery and the electric power supply is changed over from the battery to the AC electric power supply after voltage of the condenser has reached a predetermined value. Due to the above constitution, even when an inrush electric current inhibiting resistor is not used, it is possible to prevent an inrush electric current from flowing into the condenser which is not electrically charged at the time of start.

The present invention provides a method of starting an uniterruptible electric power supply, at the time of start in which a condenser, which becomes a DC electric power supply of an inverter section for converting DC voltage into AC electric power, is not electrically charged, comprising the steps of: charging the condenser by a battery; and changing over from the battery to an AC electric power supply after the condenser has been charged to a predetermined voltage. Due to the above constitution, even when an inrush electric current inhibiting resistor is not used, it is possible to prevent an inrush electric current from flowing into the condenser which is not electrically charged at the time of start.

Further, the present invention provides an uniterruptible electric power supply comprising: a common line for connecting one end of an AC electric power supply with one end of an AC output; a positive electrode side voltage line and a negative electrode side voltage line which respectively become a positive electrode side and a negative electrode side of DC formed at both ends of diodes connected with each other in series, a connecting point of the diodes connected with each other in series being connected with the other end of the AC electric power supply; a first condenser connected between the common line and the voltage line on the positive electrode side; a second electrode connected between the common line and the voltage line on the negative electrode side; a battery, the negative electrode side of which is connected with the common line; a negative electrode side boosting section semiconductor switch, one end collector side of which is connected with the positive electrode side of the battery; a negative electrode side boosting section reactor connected between the other end emitter side of the negative electrode side boosting section semiconductor switch and the common line; a negative electrode side boosting section diode, one end on the cathode of which is connected with the other end on the emitter side of the negative electrode side boosting section semiconductor switch, the other end on the anode side of which is connected with the negative electrode voltage line; a first semiconductor switch of a balance section and a second semiconductor switch of the balance section connected with each other in series between the positive electrode voltage line and the negative electrode voltage line; a first diode of the balance section and a second diode of the balance section which are respectively connected with the first semiconductor switch of the balance section and the second semiconductor switch of the balance section in reverse parallel with each other; a reactor of the balance section connected between a contacting point, at which the first semiconductor switch of the balance section and the second semiconductor switch of the balance section are contacted with each other, and the common line; and a control section for turning on and off the negative electrode side boosting section semiconductor switch and the second semiconductor switch of the balance section, wherein after the second condenser is electrically charged by the battery when the negative electrode side boosting section semiconductor switch is turned on and off at the time of start, the second semiconductor switch of the balance section is turned on and off so as to electrically charge the first condenser by utilizing voltage of the second condenser.

Due to the above constitution, it becomes unnecessary to give consideration to the heat generated from an inrush electric current inhibiting resistor. Therefore, a size of the uniterruptible electric power supply can be reduced.

Further, the present invention provides an uninterruptible electric power supply, in which the control section changes over the electric power supply to the AC electric power supply after voltage of the first condenser and voltage of the second condenser are equilibrated to each other and raised to a predetermined voltage.

Due to the above constitution, it is possible to provide an uninterruptible electric power supply capable of smoothly changing over the input of electric power from the battery to the AC electric power supply.

The present invention provides a method of starting an uninterruptible electric power supply comprising: a first step in which a second condenser is electrically charged to a voltage not lower than a predetermined voltage by using a battery at the time of start in which a first condenser connected between a common line, which connects one end of an AC electric power supply with one end of an AC output, and a positive electrode voltage line is not electrically charged and the second condenser connected between the common line and the negative electrode voltage line is not electrically charged; a second step in which the first condenser is electrically charged by utilizing voltage of the second condenser until voltage of the first condenser and voltage of the second condenser are equilibrated to each other; and a third step in which processing of the first and second steps is successively conducted until voltage of the first condenser and voltage of the second condenser are raised to a value not lower than a predetermined value, and electric power input is changed over from the battery to the AC power supply at the point of time when voltage of the first condenser and voltage of the second condenser are raised to a value not lower than a predetermined value. Therefore, after the uninterruptible electric power supply is started by the input from the battery, it can be smoothly changed over to the input from the AC electric power supply.

BEST MODE FOR CARRYING OUT THE INVENTION

Embodiment 1

Figure 1:
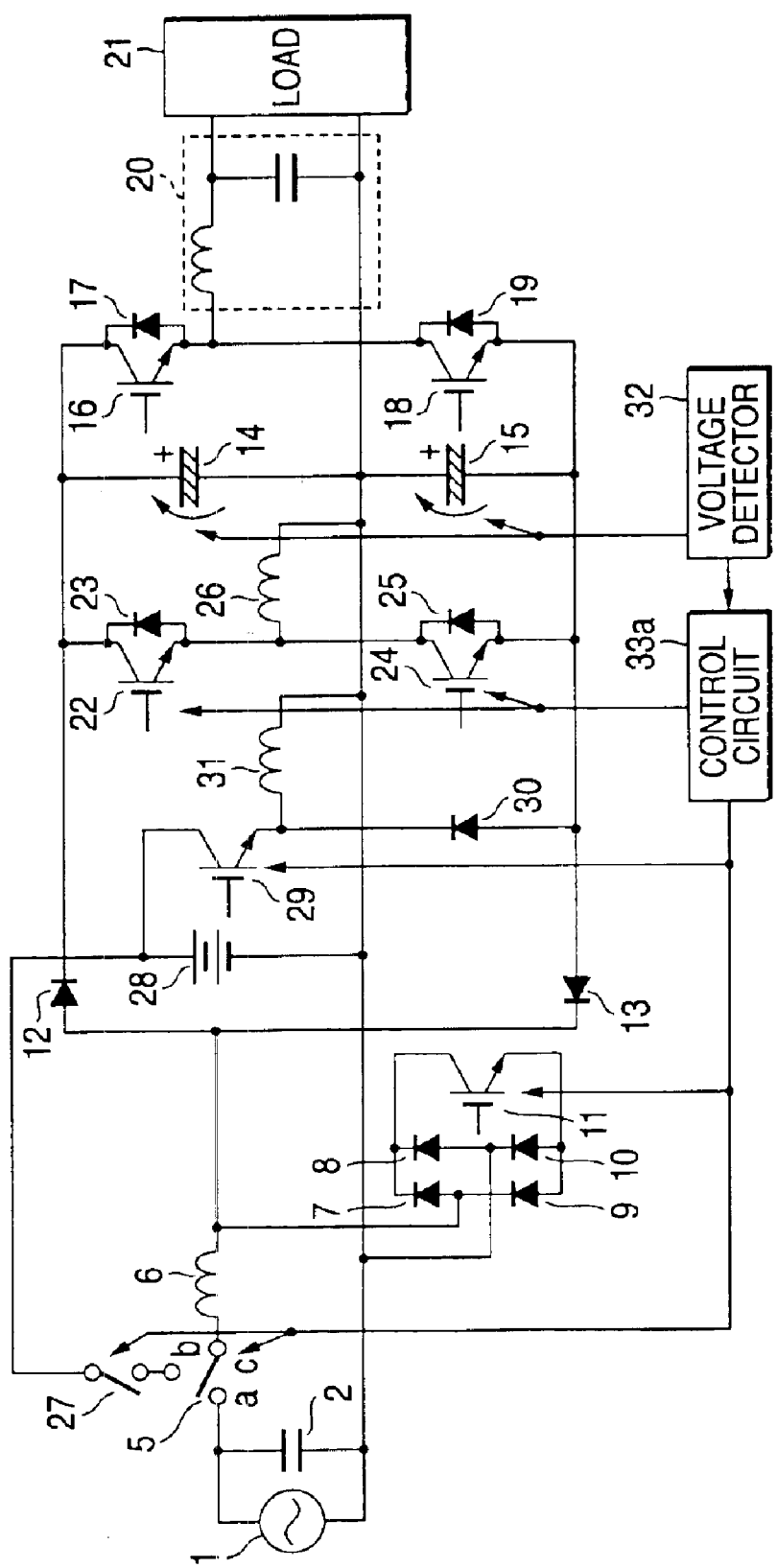
FIG. 1 is an arrangement view showing an outline of the uninterruptible electric power supply of Embodiment 1 of the present invention.
Figure 4:
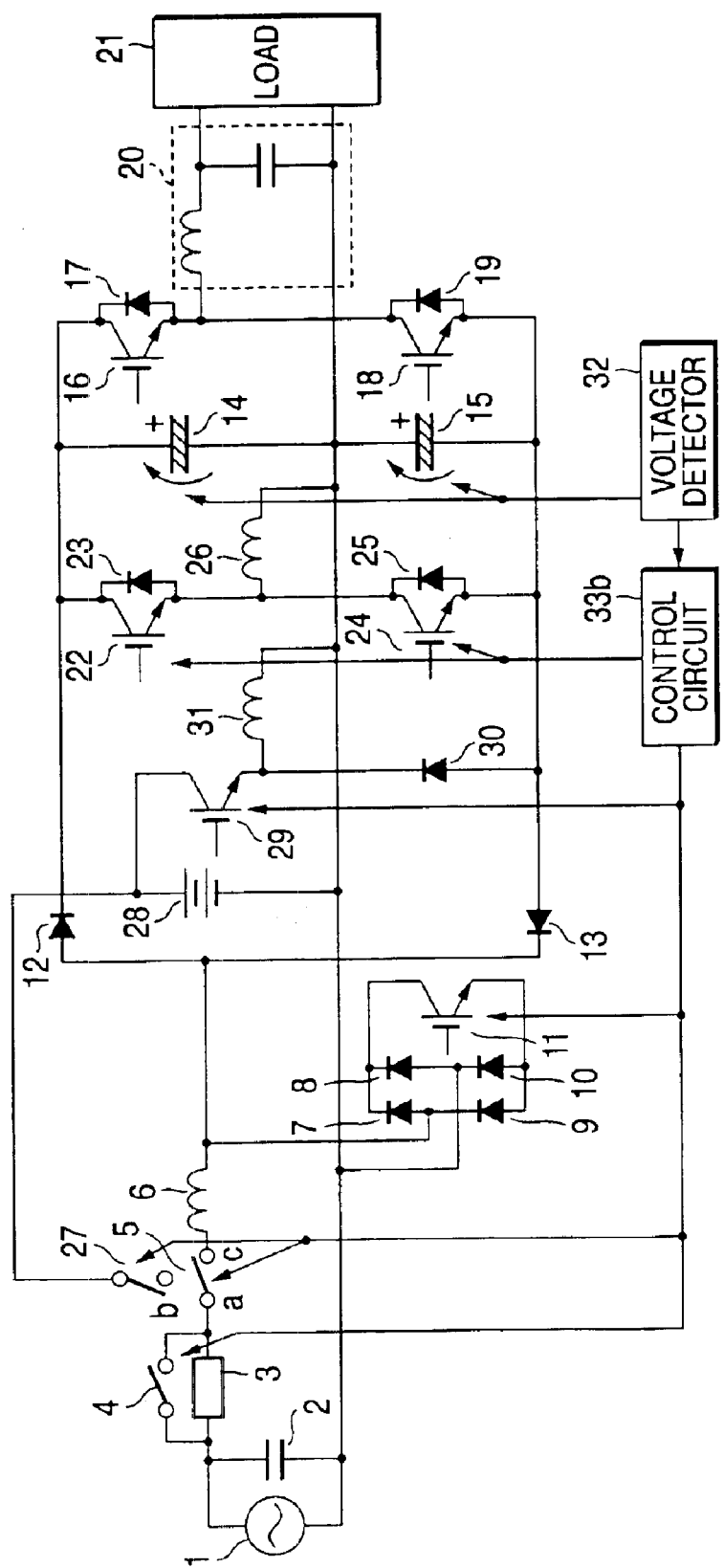
FIG. 4 is an arrangement view showing an outline of the conventional uninterruptible electric power supply.
Figure 5A:
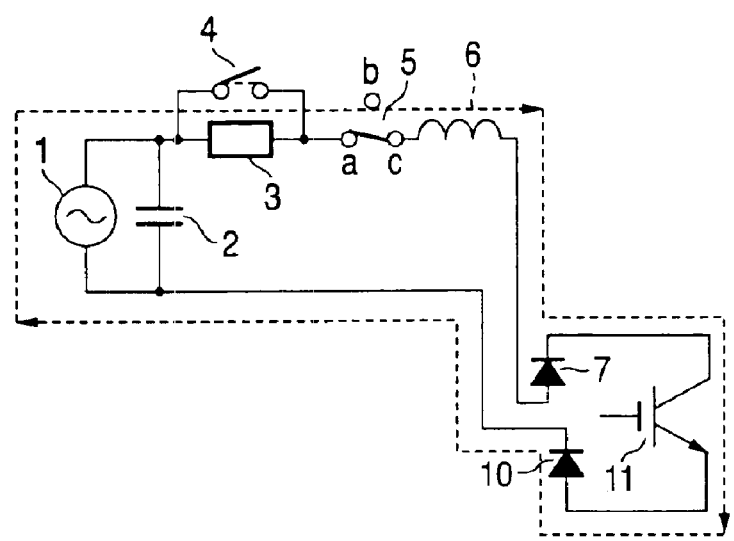
FIGS. 5A and 5B are views for explaining an electrically charging motion conducted by the AC electric power supply 1 in the conventional uninterruptible electric power supply.
Figure 5B:
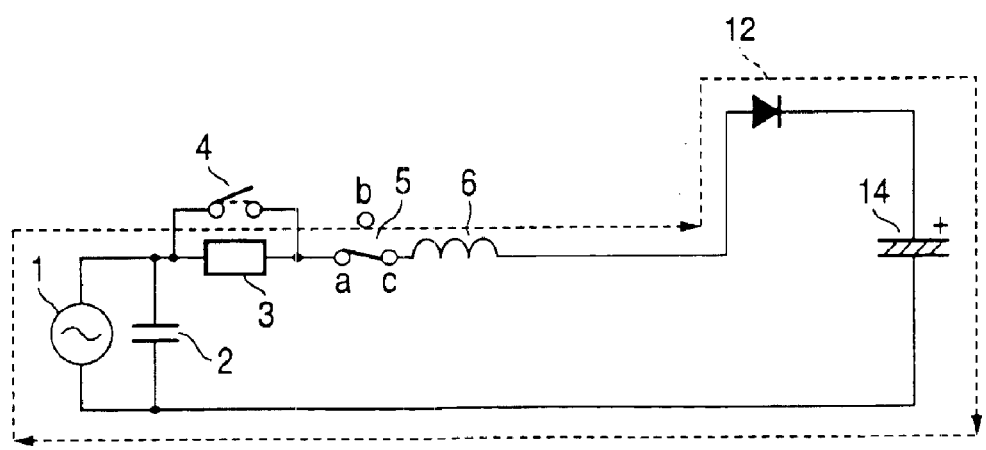
Figure 6A:
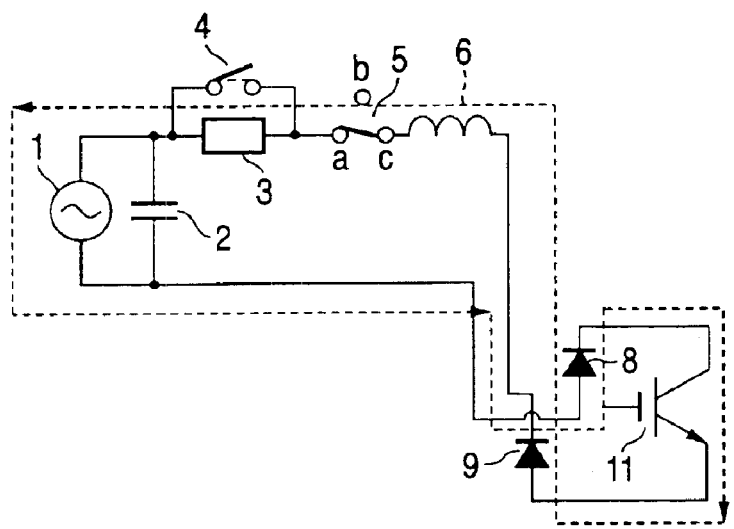
FIGS. 6A and 6B are views for explaining an electrically charging motion conducted by the AC electric power supply 1 in the conventional uninterruptible electric power supply.
Figure 6B:
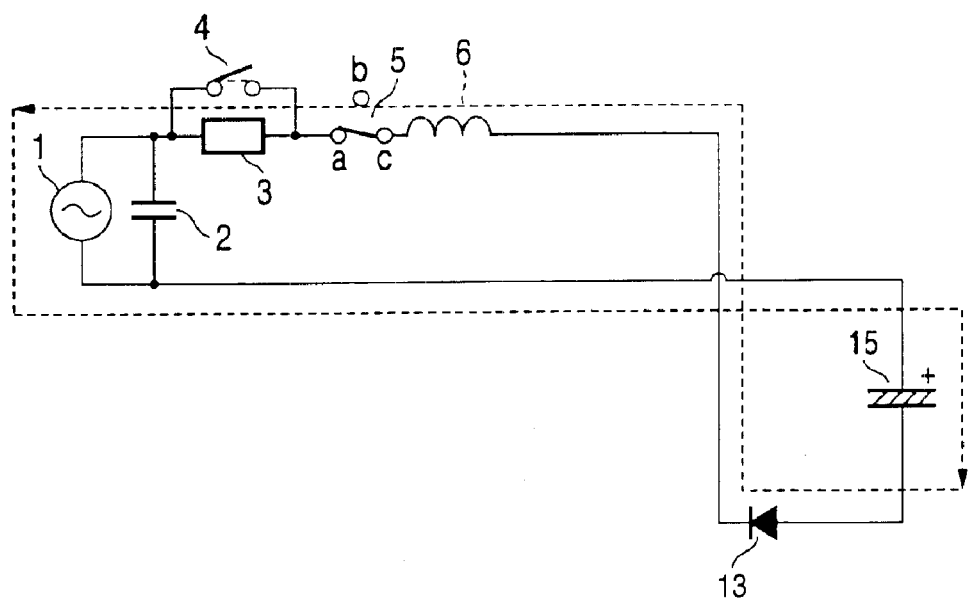

FIG. 1 is an arrangement view showing an outline of the uninterruptible electric power supply of Embodiment 1 of the present invention. In the view, reference numerals 1, 2 and 5 to 32 represent the same components as those shown in FIG. 4. Therefore, the explanations are omitted here. Reference numeral 33a is a control circuit for controlling an AC-electric-power-supply/battery changeover switch 5, a first semiconductor switch 11, a first semiconductor switch 16 of the inverter section, a second semiconductor switch 18 of the inverter section, a first semiconductor switch 22 of the balance section, a second semiconductor switch 24 of the balance section, a battery operation switch 27 and a negative electrode side boosting section semiconductor switch 29.

In the uninterruptible electric power supply of Embodiment 1, the battery 28 is used at the time of start so as to electrically charge the first condenser 14 and the second condenser 15, and then the AC electric power supply is connected.

The uninterruptible electric power supply of Embodiment 1 shown in FIG. 1 is composed as follows. The inrush electric current inhibiting resistor 3 for inhibiting an intensity of the inrush electric current and the switch 4 connected in parallel with the inrush electric current inhibiting resistor 3 are deleted from the constitution of the conventional uninterruptible electric power supply shown in FIG. 4, and the control circuit 33b (for controlling the switch 4, the AC-electric-power-supply/battery changeover switch 5, the battery operation switch 27; the first semiconductor switch 11, the first semiconductor switch 16 of the inverter section, the second semiconductor switch 18 of the inverter section, the first semiconductor switch 22 of the balance section, the second semiconductor switch 24 of the balance section, and the negative electrode side boosting section semiconductor switch 29) is replaced with the control circuit 33a (for controlling the AC-electric-power-supply/battery changeover switch 5, the battery operation switch 27, the first semiconductor switch 11, the first semiconductor switch 16 of the inverter section, the second semiconductor switch 18 of the inverter section, the first semiconductor switch 22 of the balance section, the second semiconductor switch 24 of the balance section, and the negative electrode side boosting section semiconductor switch 29).

However, in Embodiment 1, the contact "a" of the AC-electric-power-supply/battery changeover switch 5 is connected with the condenser 2 connected in parallel with the AC electric power supply 1 in the case of inputting electric power from the AC electric power supply, the contact "b" is contacted with the battery operation switch 27 in the case of inputting electric power from the battery, and the contact "c" is connected with the reactor 6.

A motion of electrically charging the first condenser 14 and the second condenser 15 conducted by the AC electric power supply in the normal operation, in which the AC-electric-power-supply/battery changeover switch 5 is set on the contact "a" side, is the same as the motion conducted while the inrush electric current inhibiting resistor 3 for inhibiting an inrush electric current and the switch 4, which is connected in parallel with the inrush electric current inhibiting resistor 3, are deleted from the conventional constitution shown in FIGS. 5(a), 5(b), 6(a) and 6(b).

In the case where the AC electric power supply 1 generates a positive voltage, the first semiconductor switch 11 is turned on, and electric energy is stored in the reactor 6 by the route of the AC electric power supply 1→the AC-electric-power-supply/battery changeover switch 5→the reactor 6→the diode 7 of the diode bridge→the first semiconductor switch 11→the diode 10 of the diode bridge→the AC electric power supply 1. Successively, the first semiconductor switch 11 is turned off, and electric energy stored in the reactor 6 is electrically charged into the first condenser 14 by the route of the reactor 6→the first diode 12 for preventing a back electric current→the first condenser 14→the AC electric power supply 1→the AC-electric-power-supply/battery changeover switch 5→the reactor 6, and the P-voltage line is formed with respect to the common line.

In the case where the AC electric power supply generates a negative voltage, the first semiconductor switch 11 is turned on, and electric energy is stored in the reactor 6 by the route of the AC electric power supply 1→the diode 8 of the diode bridge→the first semiconductor switch 11→the diode 9 of the diode bridge→the reactor 6→the AC-electric-power-supply/battery changeover switch 5→the AC electric power supply 1. Successively, the first semiconductor switch 11 is turned off, and electric energy stored in the reactor 6 is electrically charged into the second condenser 15 by the route of the reactor 6→the AC-electric-power-supply/battery changeover switch 5→the AC electric power supply 1→the second condenser 15→the second diode 13 for preventing a back current→the reactor 6, and the N-voltage line is formed with respect to the common line.

A motion of electrically charging the first condenser 14 and the second condenser 15 conducted by the battery 28 in the case of electric power failure is the same as that of the conventional example shown in FIGS. 7(a), 7(b), 8(a) and 8(b), and the explanations are omitted here.

Figure 2:
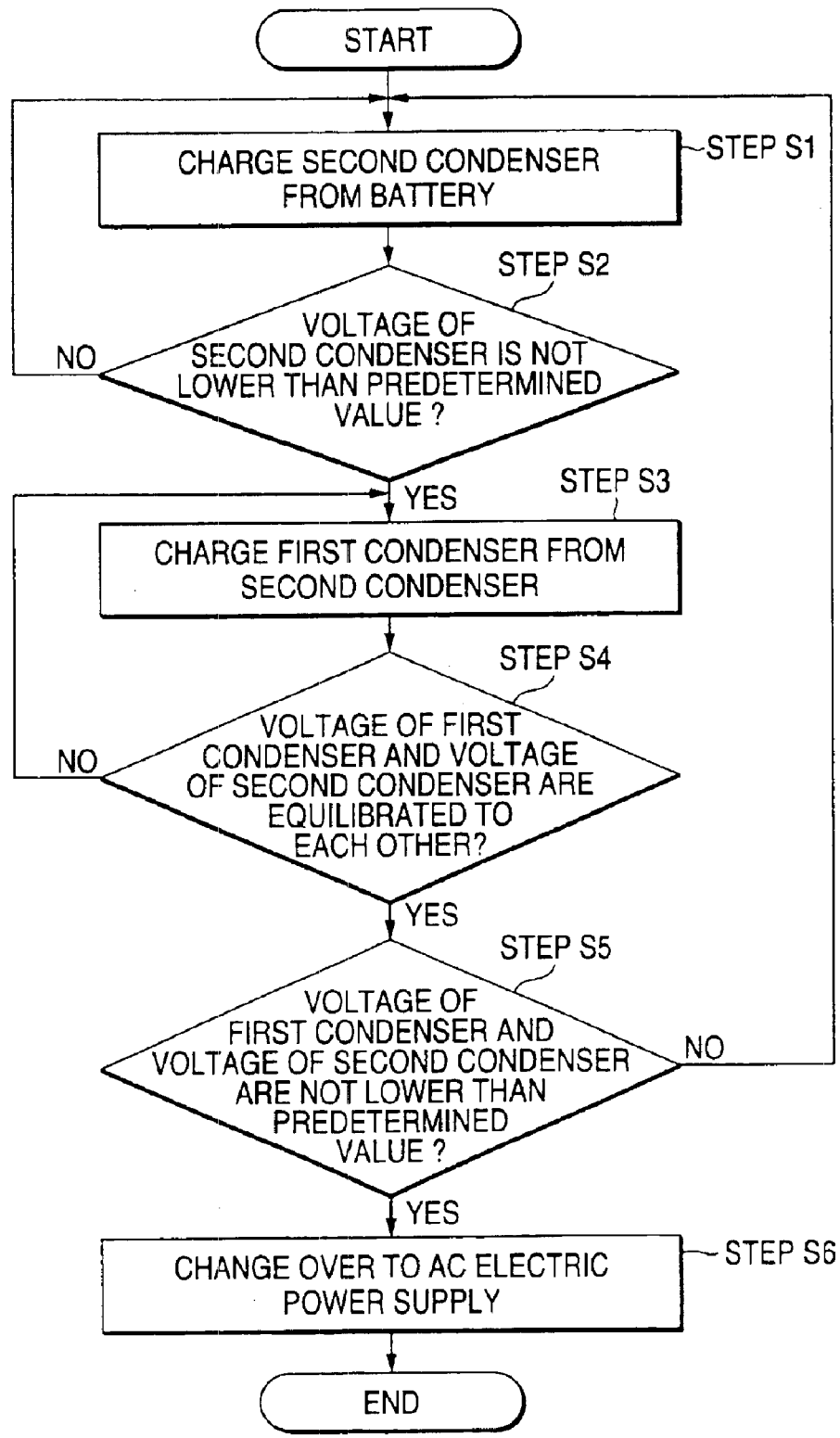
FIG. 2 is a flow chart for explaining an electrically charging motion conducted by the battery 28 at the time of start in the uninterruptible electric power supply of Embodiment 1 of the present invention.

FIG. 2 is a flow chart for explaining an electrically charging motion conducted by the battery 28 at the time of start in the uniterruptible electric power supply of Embodiment 1 of the present invention.

Figure 8A:
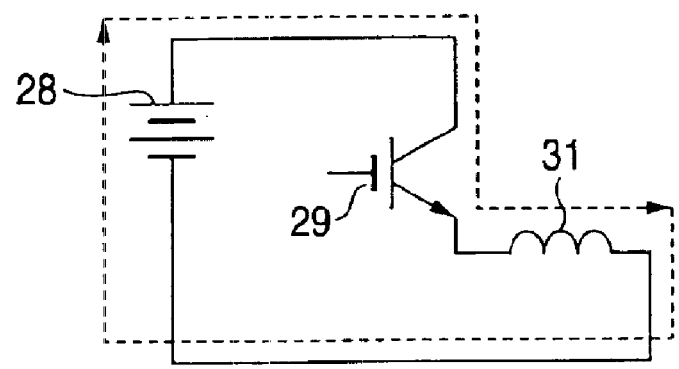
FIGS. 8A and 8B are views for explaining an electrically charging motion conducted by the battery 28 in the conventional uninterruptible electric power supply.
Figure 8B:
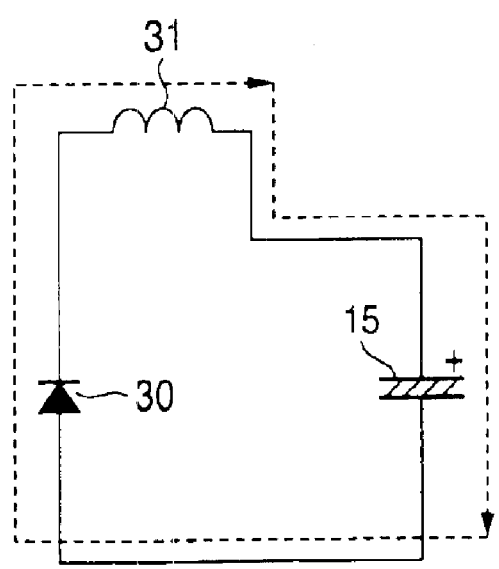

In the uniterruptible electric power supply of Embodiment 1, a motion of electrically charging the second condenser 15 by the battery 28 at the time of start is the same as the motion of electrically charging the second condenser 15 by the battery 28 at the time of electric power failure in the conventional example shown in FIGS. 8A and 8B.

Figure 3A:
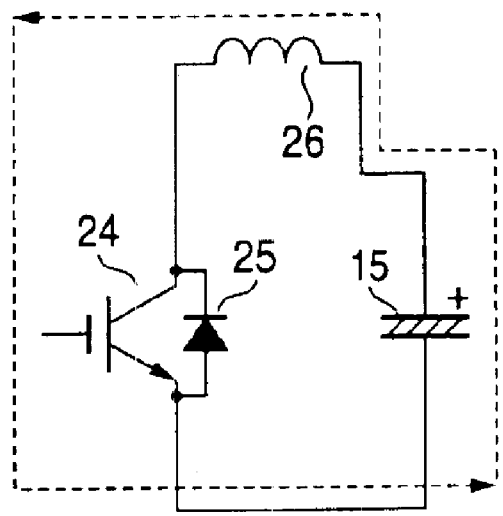
FIGS. 3A and 3B are views for explaining an electrically charging motion to charge the first condenser 14 in the uninterruptible electric power supply of. Embodiment 1 of the present invention.
Figure 3B:
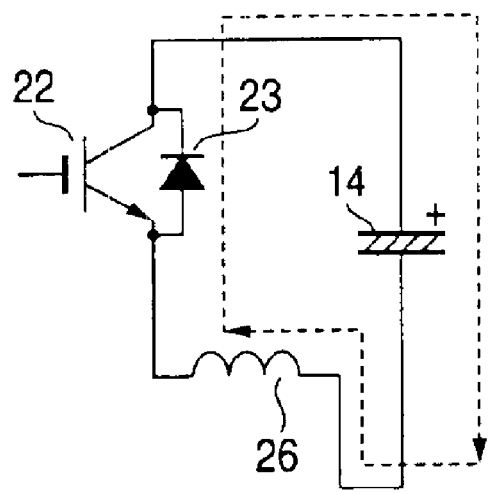

FIGS. 3A and 3B are views for explaining an electrically charging motion to charge the first condenser 14 in the uniterruptible electric power supply of Embodiment 1 of the present invention. In the view, reference numerals 14, 15, 23, 24 and 26 represent the same components as those shown in FIG. 1. Therefore, the explanations are omitted here.

Figure 7A:
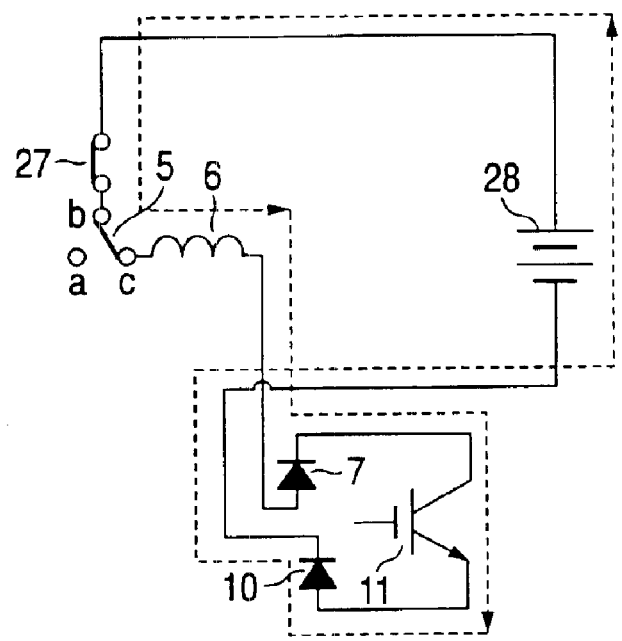
FIGS. 7A and 7B are views for explaining an electrically charging motion conducted by the battery 28 in the conventional uninterruptible electric power supply.
Figure 7B:
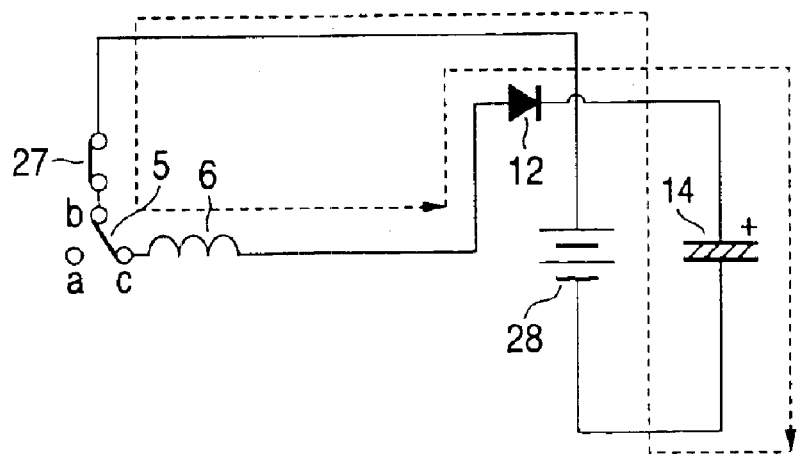

At the time of start, the first condenser 14 is not electrically charged at all. When a motion of electrically charging the first condenser 14 by the battery 28 conducted in the case of electric power failure is used at the time of start, an inrush electric current flows into the first condenser 14 by the route of the battery 28→the battery operation switch 27→the AC-electric-power-supply/battery changeover switch 5→the reactor 6→the first diode 12 for preventing a back electric current→the first condenser 14→the battery 28 as shown in FIG. 7B of the conventional example.

Accordingly, at the time of electric power failure, the AC-electric-power-supply/battery changeover switch 5 is changed over to the contact "b" side so as to short-circuit the battery operation switch 27. However, at the time of start of the uniterruptible electric power supply of Embodiment 1, the battery operation switch 27 is kept open, and the second condenser 15 is electrically charged by the battery 28. After that, by using the balance section including the first semiconductor switch 22 of the balance section, the diode 23, the second semiconductor switch 24 of the balance section, the diode 25 and the reactor 26 of the balance section, an electric charge is moved from the second condenser 15 to the first condenser 14, so that the first condenser 14 is electrically charged.

The N-side boosting section for electrically charging and boosting the second condenser 15 connected between the common line and N-voltage line, includes: the battery 28, the negative side of which is connected with the common line, the positive side of which is connected with one end (the collector side in the drawing) of the negative electrode side boosting section semiconductor switch 29; the negative electrode side boosting section semiconductor switch 29, one end (the collector side in the drawing) of which is connected with the positive electrode side of the battery 28 and the other end (the emitter side in the drawing) of which is connected with the negative electrode side boosting section reactor 31 and the cathode side of the negative electrode side boosting section diode 30; the negative electrode side boosting section diode 30, the cathode side of which is connected with the other end (the emitter side in the drawing) of the negative electrode side boosting section semiconductor switch 29 and the anode side of which is connected with the N-voltage line; and the negative electrode side boosting section reactor 31 connected between the other end (the emitter side in the drawing) of the negative electrode side boosting section semiconductor switch 29 and the common line.

Referring to FIGS. 1 to 3 and 8, a motion of the uniterruptible electric power supply of Embodiment 1 at the time of start will be explained as follows.

At the time of start when the first condenser 14 and the second condenser 15 are not electrically charged at all, the control circuit 33a changes over the first switch 5 to the contact "b" side and opens the battery operation switch 27 at the same time.

In step S1, as shown in FIGS. 8A and 8B, the control circuit 33a turns on and off the negative electrode side boosting section semiconductor switch 29 by using the battery 28, so that the second condenser 15 is electrically charged. At the time of start, the condenser is electrically charged by the battery 28 as follows.

While the negative electrode side boosting section semiconductor switch 29 is kept being turned on, electric energy is stored in the negative electrode side boosting section reactor 31 by the route of the battery 28→the negative electrode side boosting section semiconductor switch 29→the negative electrode side boosting section reactor 31→the battery 28 as shown in FIG. 8A. Next, the negative electrode side boosting section semiconductor switch 29 is turned off, and electric energy stored in the negative electrode side boosting section reactor 31 is electrically charged into the second condenser 15 by the route of the negative electrode side boosting section reactor 31→the second condenser 15→the negative electrode side boosting section diode 30→the negative electrode side boosting section reactor 31 as shown in FIG. 8B.

Successively, in step S2, it is judged whether or not voltage of the second condenser 15 is raised to be not lower than a predetermined value, for example, in the case of operation at 100 V, it is judged whether or not voltage of the second condenser 15 is raised to be not lower than 141 V, in the case of operation at 120 V, it is judged whether or not voltage of the second condenser 15 is raised to be not lower than 180 V. In the case where voltage of the second condenser 15 is lower than the predetermined value, the program returns to step S1, and the second condenser is electrically charged by the battery 28. The battery 28, the negative electrode side boosting section semiconductor switch 29, the negative electrode side boosting section reactor 31, the second condenser 15 and the negative electrode side boosting section diode 30 compose an inversion chopper circuit. When the negative electrode side boosting section semiconductor switch 29 is controlled being turned and on and off, voltage of the second condenser 15 is raised to an arbitrary voltage.

In the case where voltage of the second condenser 15 is not lower than the predetermined value in step S2, successively in step S3, the second semiconductor switch 24 of the balance section is controlled being turned on and off as shown in FIGS. 3A and 3B, and the first condenser 14 is electrically charged by the second condenser 15 so that voltage of the first condenser 14 can be the same as that of the second condenser 15. A motion of charging the first condenser 14 by the second condenser 15 is described below.

While the second semiconductor switch 24 of the balance section is kept being turned on, electric energy is stored in the reactor 26 of the balance section by the route of the second condenser 15→the rector 26 of the balance section→the second semiconductor switch 24 of the balance section→the second condenser 15 as shown in FIG. 3A. Successively, while the semiconductor switch 24 of the balance section is being kept turned off, electric energy stored in the reactor 26 of the balance section is charged into the first condenser 14 by the route of the reactor 26 of the balance section→the diode 23 of the balance section→the first condenser 14→the reactor 26 of the balance section as shown in FIG. 3B.

When the second semiconductor switch 24 of the balance section is controlled being turned on and off, voltage of the first condenser 14 is raised to an arbitrary value.

In step S4, the control circuit 33a judges whether or not voltage of the first condenser 14 and voltage of the second condenser 15 are equilibrated to each other. In the case where voltage of the first condenser 14 and voltage of the second condenser 15 are not equilibrated to each other, the program returns to step S3, and the semiconductor switch 24 of the balance section is controlled being turned on and off as shown in FIGS. 3A and 3B, so that the first condenser 14 is electrically charged by the second condenser 15.

In step S5, the control circuit 33a judges whether or not voltage of the first condenser 14 and voltage of the second condenser 15 are raised to be not lower than a predetermined value, for example, in the case of operation at 100 V, the control circuit 33a judges whether or not voltage of the first condenser 14 and voltage of the second boosting section reactor 31, the second condeser 15 and the negative electrode side boosting section diode 30 compose an inversion chopper cicuit. When the negative controlled being turned on and off, voltage of the second condenser 15 is raised to an arbitrary voltage.

In the case where voltage of the second condenser 25 is not lower that the predetermined value in step S2, successively in step S3, the second semiconductor switch 24 of the balance section is controlled being turned on and off as shown in FIGS. 3A and 3B, and the first condenser 14 is electrically changed by the second condenser 15 so that voltage of the first condenser 14 can be the same as that of the second condenser. A motion of charging the first condenser 14 by the second condenser 15 is described below.

While thesecond semiconductor switch 24 of the balance section is kept being turned on, electric energy is stored in the reactor 26 of the balance section by the route of the second condenser 15→the reactor 26 of the balance section→the second condenser 15 as shown in FIG. 3A. Successsively, while the semiconductor switch 24 of the balance section is being kept turned off, electric energy stored in the reactor 26 of the balance section is charged into the first condenser 14 by the route of the reactor 26 of the balance section→the diode 23 of the balance section→the first condenser→the reactor of the balance section as shown in FIG. 3B.

When the second semiconductor switch 24 of the balance section is controlled being turned on and off, voltage of the first condenser 14 is raised to an arbitrary value.

In step S4, the control circuit 33a judges whether or not voltage of the first condenser 14 and voltage of the second condenser 14 are equilibrated to each other, the program returns to step S3, and the semiconductor swicth 24 of the balance section is controlled being turned on and off as shown in FIGS. 3A and 3B, so that the first condenser 14 is electrically charged by the second condenser 15.

In step S5, the control circuit 33a judges whether or not voltage of the first condenser 14 and voltage of the second condenser 15 are raised to be not lower than a predetermined value, for example, in the case of operation at 100 V, the control circuit 33a judges whether or not voltage of the first condenser 14 and voltage of the second condenser 15 are raised to be not lower than 141 V, and in the case of operation at 120 V, the control circuit 33a judges whether or not voltage of the first condenser 14 and voltage of the second condenser 15 are raised to be not lower than 180 V.

In the case where voltage of the first condenser 14 and voltage of the second condenser 15 are lower than the predetermined value, processing in steps S1 to S4 is executed, so that the second condenser 15 and the first condenser 14 are electrically charged.

In the case where voltage of the first condenser 14 and voltage of the second condenser 15 are not lower, than the predetermined value in step 5, the control circuit 33a changes over the AC-electric-power-supply/battery changeover switch 5 to the contact "a" so as to connect with the AC electric power supply, and operation is conducted by the AC electric power supply 1. In this case, the battery operation switch 27 is kept open as it is opened at the time of start.

In this connection, the above explanations are made into an example of the uniterruptible electric power supply using a half bridge circuit in which the connecting point of the semiconductor switches connected in series composing the inverter section is connected with the common line by which one end of the AC electric power supply and one end of the AC output are connected with each other, and both ends of the semiconductor switches connected in series composing the inverter section are connected between the positive electrode side voltage line and the negative electrode side voltage line. However, of course, the present invention can be applied to the case of a full bridge circuit.

Industrial Applicability

As described above, according to the present invention, it is possible to inhibit an inrush electric current without using the inrush electric current inhibiting resistor 3. Therefore, the present invention can be applied to an uniterruptible electric power supply of small size. Accordingly, the uniterruptible electric power supply of the present invention can be suitably used in an office, the space of which must be reduced small.

What is claimed is:

1. An uniterruptible electric power supply comprising:
    a common line for connecting one end of an AC electric power supply with one end of an AC output;
    a positive electrode side voltage line and a negative electrode side voltage line which respectively become a positive electrode side and a negative electrode side of DC formed at both ends of diodes connected with each other in series, a connecting point of the diodes connected with each other in series being connected with the other end of the AC electric power supply;
    a first condenser connected between the common line and the voltage line on the positive electrode side;
    a second condenser connected between the common line and the voltage line on the negative electrode side;
    a battery, the negative electrode side of which is connected with the common line;
    a negative electrode side boosting section semiconductor switch, one end collector side of which is connected with the positive electrode side of the battery;
    a negative electrode side boosting section reactor connected between the other end emitter side of the negative electrode side boosting section semiconductor switch and the common line;
    a negative electrode side boosting section diode, one end on the cathode of which is connected with the other end on the emitter side of the negative electrode side boosting section semiconductor switch, the other end on the anode side of which is connected with the negative electrode voltage line;
    a first semiconductor switch of a balance section and a second semiconductor switch of the balance section connected with each other in series between the positive electrode voltage line and the negative electrode voltage line;
    a first diode of the balance section and a second diode of the balance section which are respectively connected with the first semiconductor switch of the balance section and the second semiconductor switch of the balance section in reverse parallel with each other;
    a reactor of the balance section connected between a contacting point, at which the first semiconductor switch of the balance section and the second semiconductor switch of the balance section are contacted with each other, and the common line; and
    a control section for turning on and off the negative electrode side boosting section semiconductor switch and the second semiconductor switch of the balance section, wherein
    after the second condenser is electrically charged by the battery when the negative electrode side boosting section semiconductor switch is turned on and off at the time of start, the second semiconductor switch of the balance section is turned on and off so as to electrically charge the first condenser by utilizing voltage of the second condenser.

2. An uniterruptible electric power supply according to claim 1, wherein the control section changes over the electric power supply to the AC electric power supply after voltage of the first condenser and voltage of the second condenser are equilibrated to each other and raised to a predetermined voltage.

3. A method of starting an uniterruptible electric power supply comprising:
    a first step in which a second condenser is electrically charged to a voltage not lower than a predetermined voltage by using a battery at the time of start in which a first condenser connected between a common line, which connects one end of an AC electric power supply with one end of an AC output, and a positive electrode voltage line is not electrically charged and the second condenser connected between the common line and the negative electrode voltage line is not electrically charged;
    a second step in which the first condenser is electrically charged by utilizing voltage of the second condenser until voltage of the first condenser and voltage of the second condenser are equilibrated to each other; and
    a third step in which processing of the first and second steps is successively conducted until voltage of the first condenser and voltage of the second condenser are raised to a value not lower than a predetermined value, and electric power input is changed over from the battery to the AC power supply at the point of time when voltage of the first condenser and voltage of the second condenser are raised to a value not lower than a predetermined value.

* * * * *